United States Patent [19]

Yamauchi et al.

[11] Patent Number: 4,693,725
[45] Date of Patent: Sep. 15, 1987

[54] AQUEOUS LIQUID DYE COMPOSITION CONTAINING BIFUNCTIONAL REACTIVE DYE HAVING BOTH MONOHALOGENOTRIAZINYL AND VINYL SULFONYL FIBER REACTIVE GROUPS

[75] Inventors: Noriaki Yamauchi; Shinnei Ikeou, both of Hirakata; Kunihiko Imada, Sakai, all of Japan

[73] Assignee: Sumitomo Chemical Company, Limited, Osaka, Japan

[21] Appl. No.: 831,300

[22] Filed: Feb. 20, 1986

[30] Foreign Application Priority Data

Jul. 17, 1985 [JP] Japan .................. 60-157337

[51] Int. Cl.$^4$ ............ C09B 67/00; C09B 62/00
[52] U.S. Cl. .............................. 8/527; 8/528;
8/549; 8/657; 8/661; 8/662; 8/677; 8/681;
8/686; 8/687; 8/688; 8/917; 8/918; 8/924
[58] Field of Search ............. 8/527, 528, 549

[56] References Cited

U.S. PATENT DOCUMENTS

| | | | |
|---|---|---|---|
| 4,072,463 | 2/1978 | Schlafer et al. | 8/527 |
| 4,078,885 | 3/1978 | Opitz et al. | 8/527 |
| 4,435,181 | 3/1984 | Hoguet et al. | 8/527 |
| 4,439,205 | 3/1984 | Harada et al. | 8/527 |
| 4,443,224 | 4/1984 | Opitz | 8/527 |
| 4,540,418 | 9/1985 | Otake et al. | 8/524 |
| 4,548,612 | 10/1985 | Kayane et al. | 8/524 |
| 4,588,411 | 5/1986 | Scheibli et al. | 8/528 |

FOREIGN PATENT DOCUMENTS 0122757 10/1984 European Pat. Off.
0127456 12/1984 European Pat. Off.

Primary Examiner—A. Lionel Clingman
Attorney, Agent, or Firm—Stevens, Davis, Miller & Mosher

[57] ABSTRACT

An aqueous liquid dye composition improved in storage stability, which comprises a bifunctional reactive dye of the following formula,

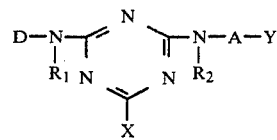

wherein D is an organic dye residue having at least one sulfonic acid group, $R_1$ and $R_2$ are independently a hydrogen atom or an unsubstituted or substituted lower alkyl group, A is an substituted or substituted phenylene or naphthylene group, X is a halogen atom, and Y is $-SO_2CH=CH_2$ or $-SO_2CH_2CH_2Z$, in which Z is a splittable group by an alkali, in an amount of 5 to 50% by weight based on the weight of the liquid dye composition, the liquid dye composition having a pH value of from 3 to 7.

10 Claims, No Drawings

AQUEOUS LIQUID DYE COMPOSITION CONTAINING BIFUNCTIONAL REACTIVE DYE HAVING BOTH MONOHALOGENOTRIAZINYL AND VINYL SULFONYL FIBER REACTIVE GROUPS

The present invention relates to a reactive dye-containing aqueous liquid composition having high storage stability.

More specifically, the present invention relates to an aqueous liquid dye composition containing a bifunctional reactive dye of the following formula (I),

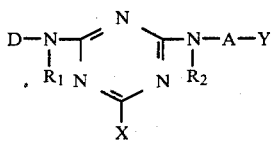

wherein D is an organic dye residue having at least one sulfonic acid group, $R_1$ and $R_2$ are independently a hydrogen atom or an unsubstituted or substituted lower alkyl group, A is an unsubstituted or substituted phenylene or naphthylene group, X is a halogen atom, and Y is $-SO_2CH=CH_2$ or $-SO_2CH_2CH_2Z$, in which Z is a splittable group by an alkali.

Industrial dyeing and printing have been carried out usually in an aqueous medium, and therefore dyes commercially available in the form of powder or granule must be dissolved in hot water to be subjected to the aqueous medium dyeing and printing.

Recently, development of dyes in a form suitable for an automatic weighing system has been required increasingly, because a dye house has been actively automated in many aspects.

An aqueous liquid dye composition is now noticeable, because it makes no dust when handled and has no pollution problem on an operation environment, it requires no dissolving process to contribute to a labor-and energy-saving, and moreover it is suitable for the automatic weighing system. Thus, an aqueous liquid dye composition has been required eagerly to be developed on a commercial scale.

A reactive dye-containing aqueous liquid composition is rather stable at ambient temperature. From industrial of view, however, it is usually left at a relatively low temperature such as 0° C. or lower, or a relatively high temperature such as 40° C. or higher through manufacture, custody, transportation including shipping, storage and the like. For this reason, a storage stability at a relatively low or high temperature is a serious problem from industrial point of view.

Particularly, at a relatively high temperature, the reactive dye is, as known, subject to chemical change, i.e. hydrolysis or physical change. Therefore, storage for a long period of time at a relatively high temperature causes troubles such that dyeing or printing in any known manner only gives dyed or printed products of a color different from that expected.

With respect to the hydrolysis of the fiber-reactive group of the dye, its degree greatly depends on a pH value. As known, a reactive dye having only a halogenotriazinyl group as the fiber-reactive group is subjected to hydrolysis under acid conditions, whereas it is stable under neutral or weak alkaline conditions. On the other hand, a reactive dye having only a vinylsulfone type group such as sulfatoethylsulfonyl group is subject to hydrolysis under alkaline conditions, whereas it is stable under acid conditions. For this reason, in order to improve the storage stability, the reactive dye having a halogenotriazinyl group is incorporated with a buffer capable of keeping a pH within a weak alkaline region, and the reactive dye having a vinylsulfone type group is incorporated with a buffer capable of keeping a pH within an acidic region.

The reactive dye to be improved in the storage stability in accordance with the present invention is a bifunctional reactive dye of the above formula (I) having two kinds of the fiber-reactive group, i.e. the halogenotriazinyl group and the vinylsulfone type group, which are different from each other in a stable pH region, and therefore it is difficult to improve its storage stability on the basis of aforesaid common knowledge.

Particularly, the hydrolysis of the reactive dye in the form of an aqueous liquid composition is more remarkable, as compared with that of the reactive dye in the form of powder. Moreover, the aqueous liquid dye composition is subject to gellation or crystalization during storage, and therefore the storage stability of the aqueous liquid dye composition must be improved also from the physical aspect.

Under these circumstances, the present inventors have extensively undertaken studies to improve the storage stability of the aqueous liquid composition containing the bifunctional reactive dye of the above formula (I). Surprising is finding that the storage stability can be improved by controlling the pH of the aqueous liquid dye composition within a range of 3 to 7 in spite of the presence of the hologenotriazinyl group in the dye molecule.

The present invention provides an aqueous liquid dye composition, which comprises a bifunctional reactive dye represented by the above formula (I) in an amount of 5 to 50% by weight based on the weight of the liquid dye composition, the liquid dye composition having a pH value of from 3 to 7.

In the formula (I) representing the reactive dye usable in the present invention, the organic dye residue having at least one sulfonic acid group represented by D includes dye residues of monoazo, polyazo such as disazo, metal complex monoazo, or disazo, metal formazan, anthraquinone, metal phthalocyanine, stilbene, oxazine, dioxazine, triphenylmethane, phenazine, xanthene, thioxanthene, naphthoquinone, pyrenequinone, perylenetetracarboimide, nitro or azo methine and the like. The center metal in the metal complexes, metal formazan and metal phthalocyanine dyes includes Cu, Cr, Co, Ni, Fe and the like.

The lower alkyl group represented by $R_1$ and $R_2$ is preferably an alkyl group having 1 to 4 carbon atoms, which may be unsubstituted or substituted with hydroxyl, cyano, alkoxy, carboxyl, halogen, carbamoyl, alkoxycarbonyl, alkylcarbonyloxy, sulfo or sulfamoyl. Examples of $R_1$ and $R_2$ are hydrogen, methyl, ethyl, n-propyl, isopropyl, n-butyl, iso-butyl, sec-butyl, 2-hydroxyethyl, 2-hydroxypropyl, 3-hydroxypropyl, 2,3 or 4-hydroxybutyl, 2,3- or 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these, preferred are hydrogen, methyl, ethyl, 2-carbamoylethyl and 2-carboxyethyl.

The phenylene group represented by A may be unsubstituted or substituted with one or two members selected from methyl, ethyl, methoxy, ehtyoxy, chlorine, bromine and sulfo. The naphthylene A may be unsubstituted or substituted with one sulfo. Examples are as follows.

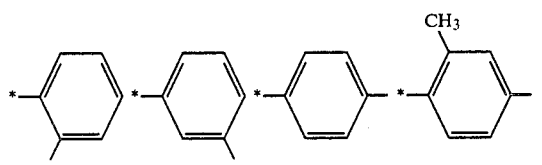

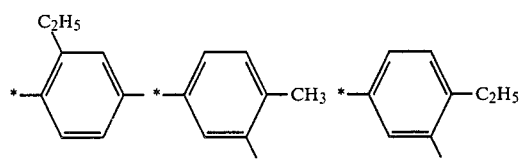

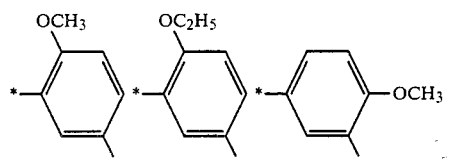

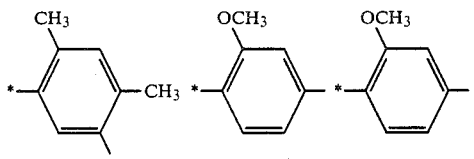

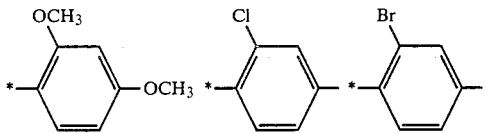

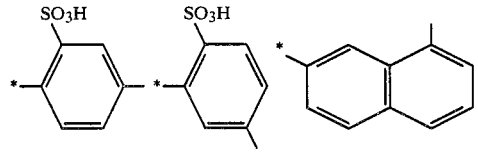

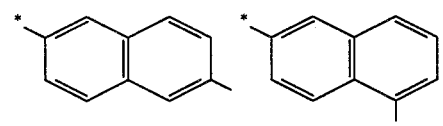

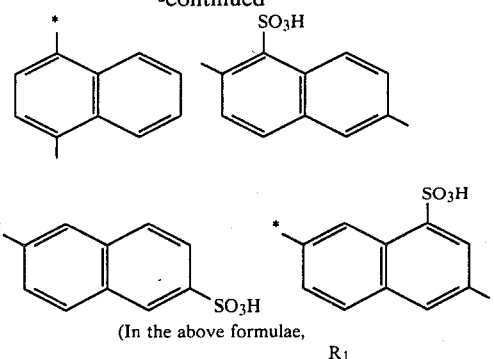

(In the above formulae, the asterished linkage is bonded to the $-\overset{R_1}{\underset{|}{N}}-$ group.)

The halogen atom represented by X includes prefereably chlorine or bromine. Particularly preferred is chlorine.

The splittble group represented by Z includes sulfuric acid ester, thiosulfuric acid ester, phosphoric acid ester, and acetic acid ester groups and halogen atoms. Preferred Y includes $-SO_2CH=CH_2$ or $SO_2CH_2CH_2OSO_3H$.

The reactive dye (I) usable in the present invention can be produced by condensing a trihalogenotriazine of the following formula (III),

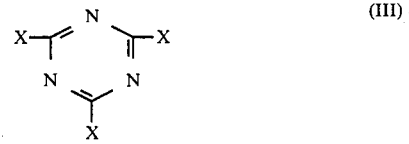
(III)

wherein X is as defined above, with an amine compound of the following formula (II),

(II)

wherein D and $R_1$ are as defined above, and an aromatic amine of the following formula (IV),

(IV)

wherein $R_2$, A and Y are as defined above, in an optional order.

Embodiments of the reactive dye (I) and methods for the production thereof are disclosed, for example, in Published Examined Japanese Patent Application Nos. 18184/1954 and 39672/1970, and Published Unexamined Japanese Patent Application Nos. 163276/1970, 4783/1971, 9483/1971, 14654/1971, 15481/1971, 37379/1971, 59870/1971, 91082/1971, 91083/1971, 92961/1971, 97262/1971, 103247/1971, 103249/1971, 103428/1971, 112584/1971, 118975/1971, 118976/1971, 123483/1971, 123484/1971, 128373/1971, 128375/1971, 128376/1971, 128377/1971, 128378/1971, 128380/1971, 128381/1971, 134279/1971, 140185/1971, 143573/1971, 159373/1971, 163153/1971, 2365/1972, 42985/1972, 42986/1972, 49663/1972, 57754/1972, 87467/1972, 89679/1972, 92054/1972, 121058/1972, 139580/1972, 141455/1972, 13360/1972, 143572/1972, 143574/1972, 143575/1972, 143576/1972, 143581/1972, 187362/1972, 187363/1972, 187364/1972, 187358/1972, 192467/1972, 198758/1972, 1973 and the like. The reactive dyes found to be especially useful for the liquid dye composition of the present invention are exemplified as follows. In the following formulae, Q is

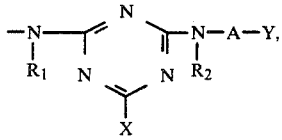

wherein $R_1$, $R_2$, A, X and Y are as defined above.

1. Monoazo dyes
   a. Pyridone dyes

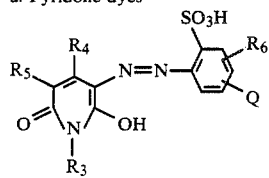

b. Pyrazolone dyes

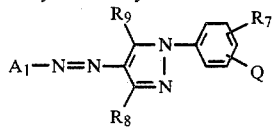

c. Acetoacetic anilide dyes

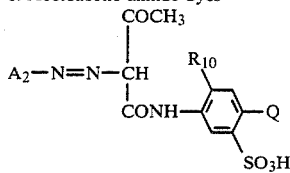

d. Naphthalene dyes

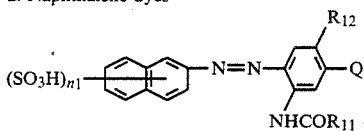

e. J acid dyes

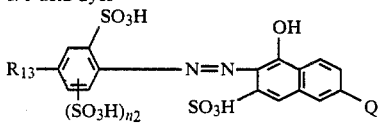

f. H acid and K acid dyes

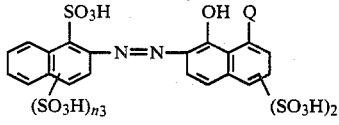

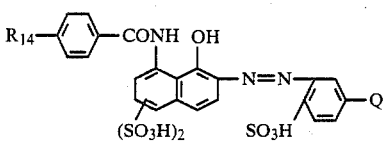

2. Bisazo dyes a.

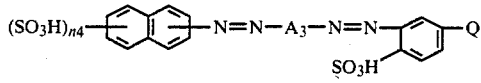

b.

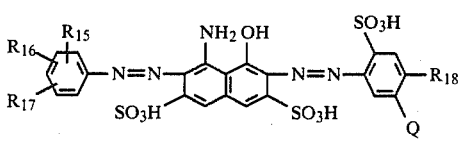

c.

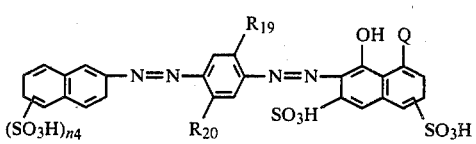

3. Metal complex bisazo dyes
   a.

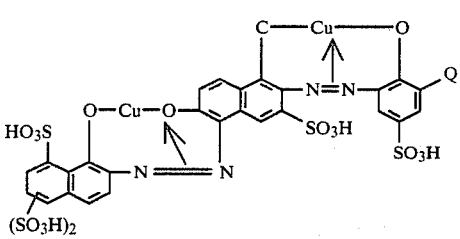

b.

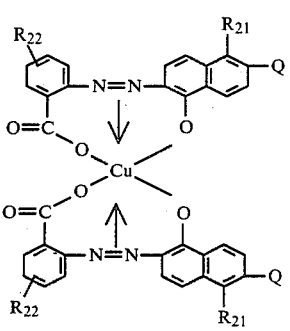

4. Phthalocyanine dyes

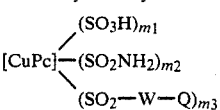

5. Anthraquinone dyes

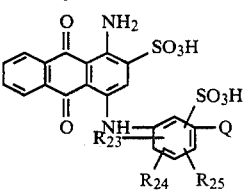

6. Formazan dyes

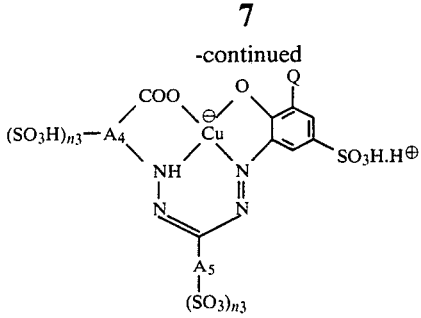

7. Dioxazine dyes

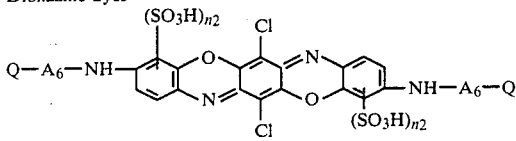

wherein $R_3$ is hydrogen or lower alkyl, $R_4$ is lower alkyl, $R_5$ is hydrogen, cyano, carbamoyl or sulfo-lower alkyl, $R_6$ is hydrogen or sulfo, $R_7$ is hydrogen, lower alkyl or sulfo, $R_8$ is methyl, carboxy or methoxycarbonyl, $R_9$ is hydroxy or amino, $R_{10}$ is methoxy, ethoxy or sulfo, $R_{11}$ is methyl, amino or phenyl, $R_{12}$ is lower alkyl, $R_{13}$ is lower alkyl or lower alkoxy, $R_{14}$ is hydrogen, nitro or substitued amino, $R_{15}$, $R_{16}$ and $R_{17}$ are independently hydrogen, chlorine, methyl, methoxy, sulfo or carboxy, $R_{18}$ is hydrogen or methyl, $R_{19}$ and $R_{20}$ are independently hydrogen, lower alkyl or lower alkoxy, $R_{21}$ is hydrogen or sulfo, $R_{22}$ is hydrogen, lower alkyl, lower alkoxy, sulfo or acetylamino, $R_{23}$, $R_{24}$ and $R_{25}$ are independently lower alkyl, $A_1$ is unsubstituted or substituted phenyl or naphthyl, $A_2$ is sulfophenyl substituted with methyl, ethyl, methoxy, ethoxy, phenoxy, acetylamino, propionylamino, HOOCCH$_2$CH$_2$CONH— or HOOCCH=CHCONH—, or naphthyl substituted with two or three sulfo, $A_3$ is residue of naphtholsulfonic acid such as H acid, K acid and the like, $A_4$ is unsubstituted or substituted phenylene, $A_5$ is unsubstituted or substituted phenyl, $A_6$ is unsubstituted or substituted phenylene, W is aminoalkyl residue such as

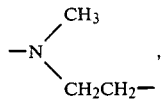

$m_1$ is 1 to 2, $m_2$ is 0 to 2 and $m_3$ is 1 to 2, provided that the sum of m1$m_1$m$_2$ and $m_3$ are 4 or less, $n_1$ is 2 or 3, $n_2$ is 0 or 1, $n_3$ is 1 or 2, and $n_4$ is 1, 2 or 3.

In the preparation of the aqueous liquid dye composition, the reactive dye-containing reaction mixture as such obtained by any method described above for the production of the reactive dye (I) may be used. The dye content may be adjusted by subjecting the reaction mixture to concentration (for example, evaporation of a part of water in vacuo). Alternatively, a part of the dye-containing reaction mixture may be dried to obtain a dye powder, and then the powder may be mixed with the remaining dye-containing reaction mixture to adjust the dye content.

When the dye-containing reaction mixture contains too large amount of inorganic salts such as sodium chloride and sodium sulfate and the like, or when the liquid dye composition prepared has a relatively high dye content, it is preferred to remove the inorganic salts in a conventional manner, for example, by cooling the reaction mixture or the liquid dye composition to precipitate the inorganic salts, which are then separated by filtration, and to adjust the inorganic salts content to 5% by weight or less, preferably 2% by weight or less, more preferably 1% by weight or less.

The pH of the aqueous liquid dye composition can be adjusted using a mineral acid such as sulfuric acid, hydrochloric acid and hydrobromic acid, or acetic acid, or an alkali such as sodium hydroxide, potassium hydroxide, sodium carbonate, potassium carbonate and sodium hydrogen-carbonate.

The aqueous liquid dye composition in accordance with the present invention may contain a buffer in an amount of 5% by weight or less based on the weight of the liquid dye composition. A preferable content can be determined depending on the kind of buffers to be used. For example, a certain buffer such as sodium acetate can exhibit a buffering effect even in a small amount such as 0.1% by weight. In the present invention, the buffer content is preferably zero or less than 1% by weight. In this case, the pH value is preferably from 3 to 5.5.

The pH value and the amount and kind of the buffer if used may be determined depending on the kind of the bifunctional reactive dye to be used. Generally speaking, a relatively high pH value (5.5 to 7) and a relatively large amount (1 to 5% by weight) of the buffer can be chosen when the reactive dye has a high water solubility, and a relatively low pH value (3 to 5.5) and a relatively small amount (0 to 1% by weight) of the buffer can be chosen when the reactive dye has a low water solubility.

The buffer which may be used in the present invention includes, for example, sodium dihydrogenphosphate, disodium hydrogenphosphate, potassium dihydrogenphosphate, dipotassium hydrogenphosphate, sodium acetate, potassium acetate, sodium borate, potassium borate, sodium oxalate, potassium oxalate, potassium hydrogenphthalate and the like. Of these, preferred are sodium or potassium oxalate, sodium or potassium acetate and sodium or potassium borate. Particularly preferred is sodium acetate. These buffers may be used each alone or in a mixture of two or more.

The aqueous liquid dye composition prepared in accordance with the present invention can be stored for a long period of time even at a relatively low or high temperature without hydrolysis of the fiber-reactive groups, i.e. the vinylsulfone type group and the halogenotriazinyl group. Moreover, the present aqueous liquid dye composition is stable also from the physical aspects, and therefore hardly produces gellation or crystallization during the storage. For example, the present aqueous liquid dye composition can give dyed or printed products of a color depth and a color shade similar to those of the products obtained using the dye composition immediately after the preparation, even when stored for 6 months at ambient temperature or for several weeks at 40° C.

The aqueous liquid dye composition of the present invention is useful for dyeing or printing fiber materials such as natural or regenerated cellulose, wool, silk, synthetic polyamides and the like, in a conventional manner.

The present invention is illustrated in more detail with reference to the following Examples, which are only illustrative and not intended to limit the scope of the present invention. In Examples, parts and % are by weight.

EXAMPLE 1

To an aqueous clear solution (900 parts) containing a dye of the following formula (1),

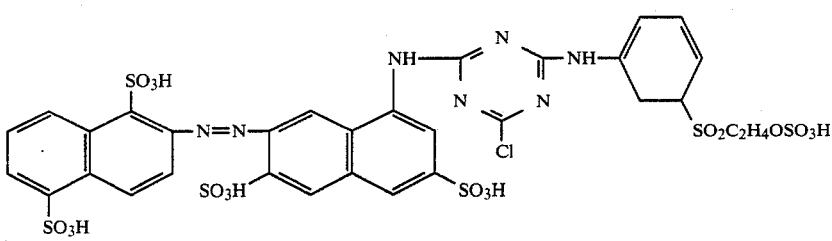

(a dye content 22.2%) was added sodium acetate trihydrate (15 parts), and the whole was made to 1000 parts with water to obtain an aqueous liquid dye composition of pH5.5.

Using the liquid dye composition (10 parts), a dyeing bath, a padding bath and a printing paste were prepared respectively in each conventional manner, and cotton was dyed or printed respectively by a conventional exhaustion, padding or printing method.

On the other hand, using a dye powder (2.5 parts) having a dye (1) content of 80%, a dyeing bath, a padding bath and a printing paste all having the same dye concentration as above were prepared respectively in the same manner as above, and cotton was dyed or printed in the same manner as above.

The resulting dyed or printed products of a red color were same in the color depth and shade.

The aqueous liquid dye composition obtained above was stored in a closed vessel for 2 weeks at 60° C., whereby no change was observed in the liquid state.

Thereafter, using the resulting dye composition (10 parts), dyed and printed products were obtained in the same manners as above. The color depth and shade thereof were not different from those of the above.

EXAMPLE 2

A known procedure was carried out to obtain a reaction mixture containing a dye of the following formulae (2),

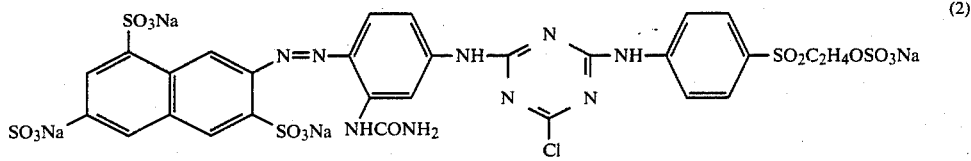

which mixture was subjected to desalting and concentration in a conventional manner, obtaining a dye solution (100 parts) having a dye content of 16% and a sodium chloride content of 0.1%.

The dye solution was mixed with sodium acetate (0.5 part), and then adjusted to pH 3.9 by adding sulfuric acid. Thus, an aqueous liquid yellow dye composition excellent in storage stability was obtained.

EXAMPLE 3

A known procedure was carried out to obtain a reaction mixture containing a dye of the following formula (3),

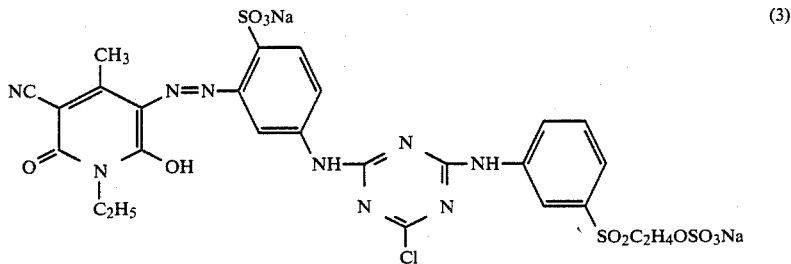

which mixture was subjected to desalting and concentration in a conventional manner, obtaining a dye solution (100 parts) having a dye content of 10% and a sodium chloride content of 0.05%.

The dye solution was mixed with sodium acetate (0.2 part) and adjusted to pH 4.2 by adding sulfuric acid. Thus, an aqueous liquid yellow dye composition excellent in storage stability was obtained.

EXAMPLE 4

Cyanuric chloride (9.2 parts) was dispersed in water (100 parts) containing a nonionic surfactant (0.1 part) at 10° C. or less. To this dispersion was dropwise added over 1 hour at 0° to 5° C. a solution prepared by dissolving sodium 2,4-diaminobenzenesulfonate (10.5 parts) in water (100 parts).

Thereafter, the reaction mixture was adjusted to pH 7.5 by adding a 20% aqueous sodium carbonate solution, and then sodium nitrite (3.5 parts) was dissolved therein. Concentrated hydrochloric acid (12.7 parts) was added thereto at 0° to 5° C. to perform diazotization. The resulting diazonium suspension was added at 0° to 5° C. to a solution prepared by dissolving 1-(4', 8'-disulfo-2'-naphthyl)-3-methylpyrazolone (19.2 parts) in water (150 parts) at pH 7.5, during which the pH was adjusted within a range of 5 to 6 by adding a 20% aqueous sodium carbonate solution. Thereafter, stirring was continued at 0° to 5° C. to complete the coupling reaction.

To this reaction mixture was added 1-aminobenzene-3-β-sulfatoethylsulfone (16.9 parts), and the mixture was heated to 40° C., while controlling the pH within a range of 5 to 6, and stirred for 5 hours at that temperature. The thus obtained a yellow dye solution (280 parts) containing a dye (43 parts) of the following formula (4),

EXAMPLE 5

Aniline-4-sulfonic acid (4.33 parts) and concentrated hydrochloric acid (3.7 parts) were added to ice water (25 parts), and then a 35% aqueous sodium nitrite solution (5.1 parts) was added thereto at 0° to 5° C. to perform diazotization. Thereafter, excess nitrous acid therein was decomposed. A neutral solution of sodium 1-amino-8-hydroxynaphthalene-3,6-disulfonate (7.81 parts) was added to the diazonium mixture over 1 hour at 0° to 10° C., and the mixture was allowed to coupling reaction at pH 0.5 to 1.5, while stirring. Three hours thereafter, sodium hydroxide was added to adjust the reaction mixture to pH 7, and sodium chloride was added thereto to obtain a monoazo dye compound.

On the other hand, a mixture of cyanuric chloride (4.6 parts) and m-phenylenediaminesulfonic acid (4.7 parts) was subjected to first condensation in an aqueous solution (50 parts) containing a nonionic surfactant at 0° to 5° C. and pH 6 to 7 for 2 hours. Thereafter, 1-aminobenzene-3-β-sulfatoethylsulfone (6.95 parts) was added thereto, and the mixture was stirred for 10 hours at 25° to 30° C., while controlling the pH within a range of 5

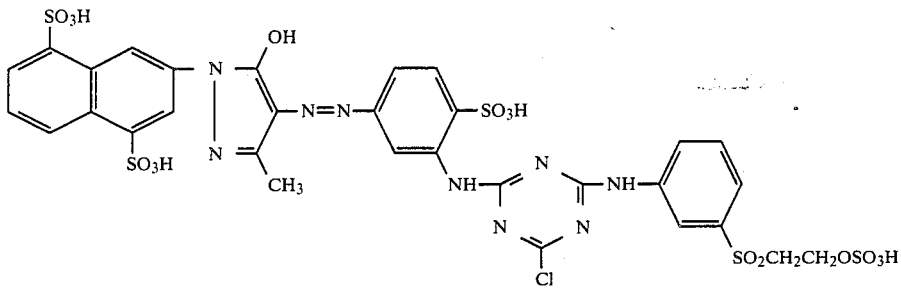

(4)

was subjected to desalting and concentration by means of ultrafiltration, obtaining a dye solution (215 parts) having a dye content of 20% and a sodium chloride content 0.3%. The dye solution was mixed with sodium dihydrogenphosphate (1 part) and adjusted to pH 3.8 with sulfuric acid, obtaining an aqueous liquid yellow dye composition having a good storage stability.

The liquid dye composition obtained was stored for 1 month at 40° C., and 1 month at 0° C., respectively, to observe no change on appearance. Thereafter, using this liquid dye composition, an exhaustion dyeing and a printing were carried out in each conventional manner to obtain a dyed product and a printed product, respectively, which were equal in the color depth and the color shade to those of respective products dyed and printed using the liquid dye composition immediately after the preparation.

to 5.5 with a 9% aqueous sodium hydrogencarbonate solution, to perform second condensation. Successively, ice (50 parts), concentrated hydrochloric acid (7.1 parts) and a 35% aqueous sodium nitrite solution (5.3 parts) were added thereto in this order to perform diazotization, and then excess nitrous acid was decomposed.

The resulting diazonium mixture was added at 5° to 10° C. to a solution prepared by dissolving the whole of the monoazo dye compound obtained above in water (300 parts) and adjusting to pH 8.5 with sodium hydrogen-carbonate, and the mixture was stirred for 2 hours to obtain a slurry (360 parts) containing a dye (7.2%) of the following formula (5),

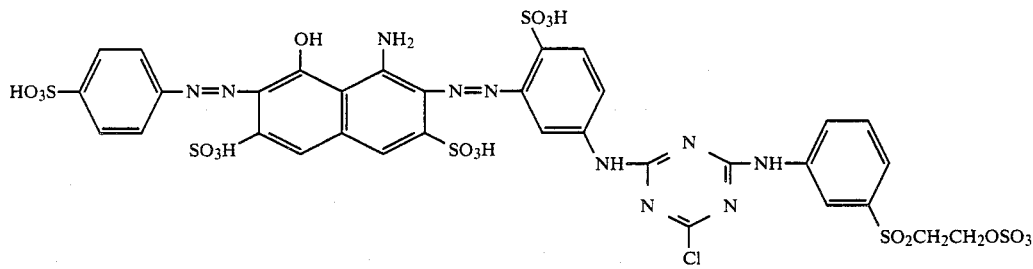

(5)

The slurry was subjected to desalting and concentration by means of ultrafiltration, obtaining a dye solution (140 parts) having a dye content of 18% and a sodium chloride content of 0.2%.

The resulting dye solution was adjusted to pH 4 with acetic acid to obtain an aqueous liquid blue dye composition excellent in storage stability.

The liquid dye composition was stored for 1 month at

EXAMPLE 7

To an aqueous solution (900 parts) containing a dye of the following formula (7),

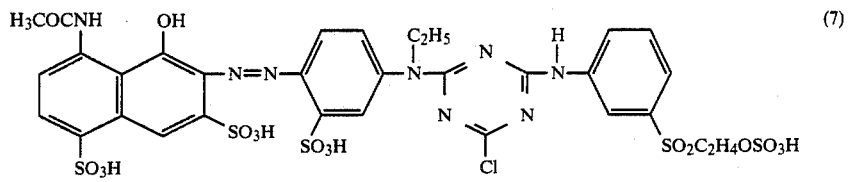

40° C., and 1 month at 0° C., respectively, to observe no change on appearance. Thereafter, using this liquid dye composition, an exhaustion dyeing and a printing were carried out in each conventional manner to obtain a dyed product and a printed product, respectively, which were equal in the color depth and shade to those of respective products dyed and printed using the liquid dye composition immediately after the preparation.

EXAMPLE 6

To an aqueous clear solution (900 parts) containing a dye of the following formula (6), (a dye content 17.8%) was added a buffer (40 parts) consisting of potassium dihydrogenphosphate and disodium hydrogenphosphate dodecahydrate in a mixing weight ratio of 1 : 24, and water was added thereto to make the whole 1000 parts. Thus an aqueous liquid dye Using the liquid dye composition (10 parts), Example 6 was repeated to obtain dyed and printed cotton products of a red color, respectively, which were equal in the color depth and shade to those of cotton products obtained using a dye powder (2 parts) having a dye (7) content of 80% in the same dyeing concentration and manner as above.

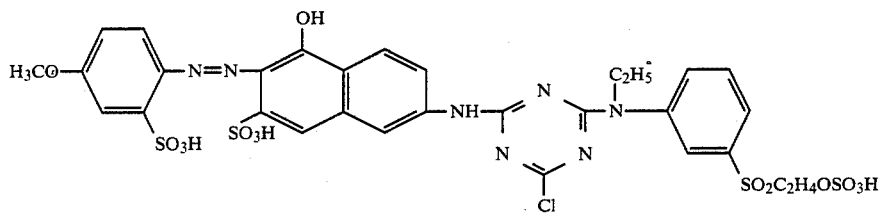

(a dye content 16.7%) was added sodium acetate trihydrate (30 parts), and water was added to make the whole 1000 parts. Thus, an aqueous liquid dye composition having a pH value of 6.1 was obtained.

Using the liquid dye composition (15 parts), exhaustion dyeing, padding and printing were carried out in each conventional manner to obtain dyed and printed cotton products of a scarlet color, respectively, which were equal in the color depth and shade to those of cotton products obtained using a dye powder (3 parts) having a dye (6) content of 75% in the same dyeing concentration and manner as above.

The above liquid dye composition was stored in a

The liquid dye composition was stored in a closed vessel for 4 weeks at 50° C. to observe no change in the liquid state. Thereafter, using this liquid dye composition (10 parts), dyed products and printed products were obtained respectively, in the same manner as above. The color depth and shade thereof were not different from those of the above.

EXAMPLE 8

To an aqueous clear solution (900 parts) containing dye of the following formula (8),
(a dye content 22.2%) was added a buffer (20 parts) consisting of potassium dihydrogenphosphate and diso-

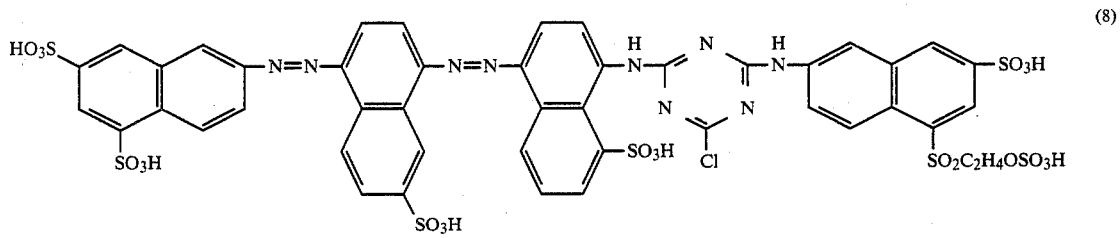

closed vessel for 2 weeks at 60° C. to observe no change in the liquid state. Thereafter, using this liquid dye composition (15 parts), dyed products and printed products were obtained respectively, in the same manner as described above. The color depth and shade thereof were not different from those of the above.

dium hydrogenphosphate dodecahydrate in a mixing weight ratio of 1 : 199, and the whole was made to 1000 parts with water to obtain an aqueous liquid dye composition of pH 4.0.

Using the liquid dye composition (10 parts), Example 6 was repeated to obtain dyed and printed products of a brown color, respectively, which were equal in the color depth and shade to those of products obtained using a dye powder (2.5 parts) of a dye (8) content of 80% in the same dyeing concentration and manner as above.

The liquid dye composition was stored in a closed vessel for 4 weeks at 40° C. to observe no change in the liquid state. Thereafter, using this liquid composition (10 parts), the dyed products and printed products were obtained in the same dyeing concentration and manner as above. The color depth and shade thereof were not different from those of the above.

EXAMPLE 9

To an aqueous clear solution (900 parts) containing a dye of the following formula (9),

EXAMPLE 10

To an aqueous clear solution (900 parts) containing a dye of the following formula (10),

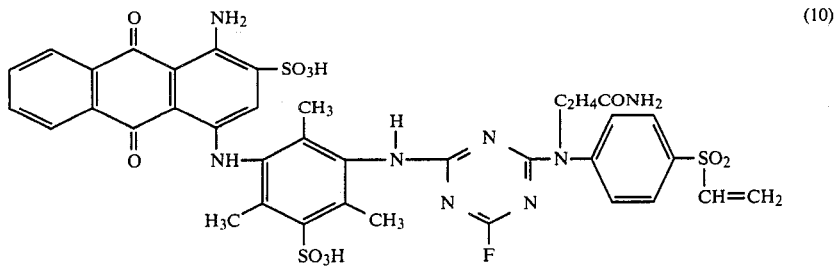

(10)

(a dye content of 22.2%) was added a buffer (20 parts) consisting of potassium dihydrogenphosphate and disodium hydrogenphosphate dodecahydrate in a mixing weight ratio of 1 : 24, and the whole was made 1000 parts with water to obtain an aqueous liquid dye composition of pH 5.3.

Using the liquid dye composition (10 parts), Example 6 was repeated to obtain dyed products and printed products of a blue color, respectively, which were equal in the color depth and shade to those of products obtained using a dye powder (5 parts) having a dye (10) content of 80% in the same dyeing concentration and

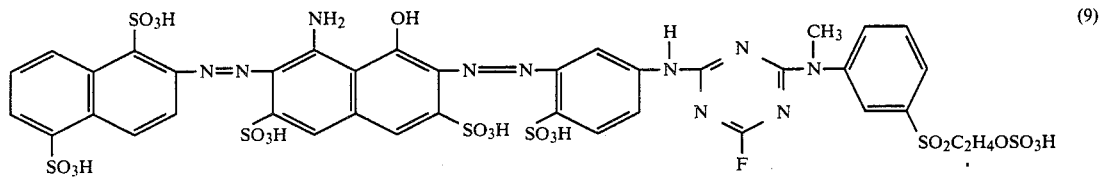

(9)

(a dye content 22.2%) was added sodium acetate trihydrate (10 parts), and the whole was made to 1000 parts with water to obtain an aqueous liquid dye composition of pH 5.6.

Using the liquid dye composition (20 parts), Example 6 was repeated to obtain dyed and printed products of a navy blue color, respectively, which were equal in the color depth and shade to those of products obtained using a dye powder (5 parts) having a dye (9) content of 80% in the same dyeing concentration and manner as above.

The liquid dye composition was stored in a closed vessel for 2 weeks at 60° C. to observe no change in the liquid state. Thereafter, using this liquid composition (20 parts), dyed and printed products were obtained, respectively in the same manner as above. The color depth and shade thereof were not different from those of the above.

manner as above.

The liquid dye composition was stored in a closed vessel for 4 weeks at 40° C. to observe no change in the liquid state. Thereafter, using this liquid composition (10 parts), dyed products and printed products were obtained, respectively, in the same manner as above. The color depth and shade thereof were not different from those of the above.

EXAMPLE 11

To an aqueous clear solution (900 parts) containing a dye of the following formula (11),

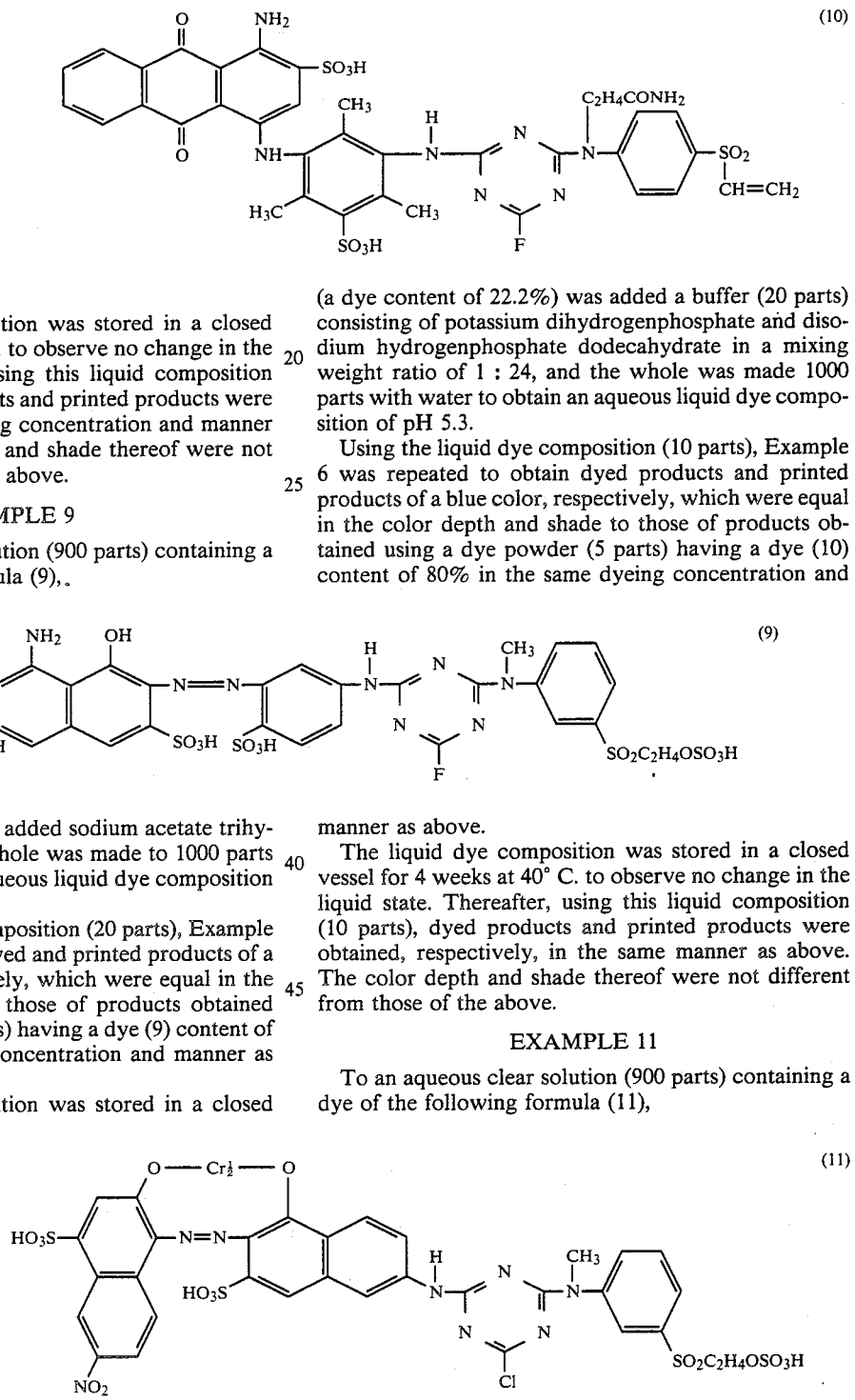

(11)

(a dye content 17.8%) was added a buffer (20 parts) containing of potassium dihydrogenphosphate and disodium hydrogenphosphate dodecahydrate in a mixing weight ratio of 1 : 199, and the whole was made to 1000 parts with water to obtain an aqueous liquid dye composition of pH 6.8.

Using the liquid dye composition (100 parts), Example 6 was repeated to obtain dyed product and printed product of a grey color, respectively, which were equal in the color depth and shade to those of products obtained using a dye powder (20 parts) having a dye (11) content of 80% in the same dyeing concentration and manner as above.

The liquid composition was stored in a closed vessel for 4 weeks at 40° C. to observe no change in the liquid state. Thereafter, using this liquid (100 parts), dyed products and printed products were obtained, respectively, in the same manner as above. The color depth and shade thereof were not different from those of the above.

EXAMPLE 12

To an aqueous clear solution (900 parts) containing a dye of the following formula (12),

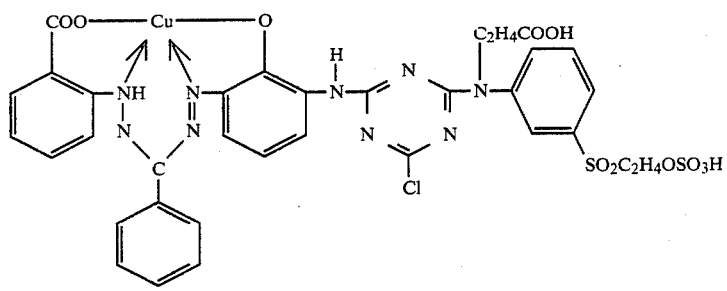

(a dye content 16.7%) was added sodium acetate (2 parts), and the whole was made to 1000 parts with water to obtain an aqueous liquid dye composition of pH 5.7.

Using the liquid composition (20 parts), Example 6 was repeated to obtain dyed products and printed products of a blue color, respectively, which were equal in the color depth and shade to those of products obtained using a dye powder (4 parts) having a dye (12) content of 75% in the same dyeing concentration and manner as above.

The liquid composition was stored in a closed vessel for 2 weeks at 60° C. to observe no change in the liquid state. Thereafter, using this liquid composition (20 parts), dyed products and printed products were obtained, respectively, in the same manner as above. The color depth and shade thereof were not different from those of the above.

EXAMPLE 13

To an aqueous. clear solution (900 parts) containing a dye of the following formula (13),

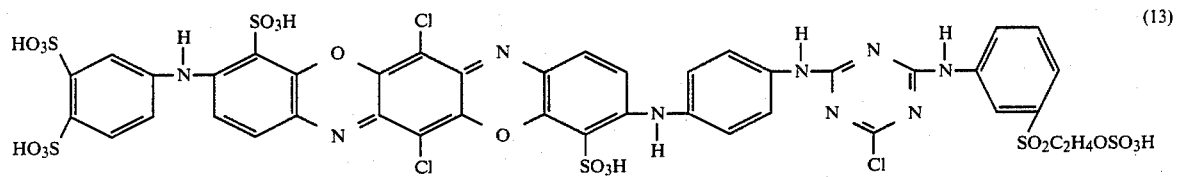

(a dye content 16.7%) was added a buffer (10 parts) consisting of potassium dihydrogenphosphate and disodium hydrogenphosphate dodecahydrate in a mixing weight ratio of 1 : 24, and the whole was made to 1000 parts with water to obtain an aqueous liquid dye composition of pH 5.8.

Using the liquid dye composition (20 parts), Example 6 was repeated to obtain dyed products and printed products of a blue color, respectively, which were equal in the color depth and shade to those of products obtained using a dye powder (4 parts) having a dye (13) content of 75% in the same dyeing concentration and manner as the above.

The liquid dye composition was stored in a closed vessel for 4 weeks at 40° C. to observe no change in the liquid state. Thereafter, using this liquid dye composition (20 parts), dyed products and printed products were obtained, respectively, in the same manner as the above. The color depth and shade thereof were not different from those of the above.

EXAMPLE 14

To an aqueous clear solution (900 parts) containing a dye of the following formula (14),

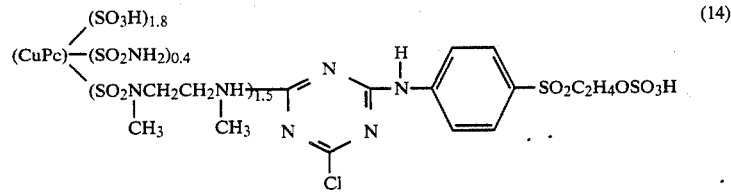

(a dye content 22.2%) was added a buffer (20 parts) consisting of potassium dihydrogenphosphate and disodium hydrogenphosphate dodecahydrate in a mixing weight ratio of 1 : 199, and the whole was made to 1000 parts with water to obtain an aqueous liquid dye composition of pH 7.0.

Using the liquid composition (20 parts), Example 6 was repeated to obtain dyed products and printed products of a blue color, respectively, which were equal in the color depth and shade to those of products obtained using a dye powder (5 parts) having a dye (14) content of 80% in the same dyeing concentration and manner as the above.

The liquid composition was stored in a closed vessel for 4 weeks at 40° C. to observe no change in the liquid state. Thereafter, using this liquid composition (20 parts), dyed products and printed products were obtained, respectively, in the same manner as the above. The color depth and shade thereof were not different from those of the above.

EXAMPLES 15 to 21

According to a manner similar to that of Example 2, the following aqueous liquid dye compositions which were excellent in storage stability were obtained.

| Example No. | Dye | Content (%) | | | | pH |
| | | Dye | Sodium chloride | Sodium sulfate | Sodium acetate | |
| --- | --- | --- | --- | --- | --- | --- |
| 15 | Formula (15) | 10 | 2 | 1 | 0.5 | 5.0 |
| 16 | Formula (16) | 10 | 3 | 0.5 | 0.1 | 5.1 |
| 17 | Formula (17) | 8 | 1 | 2 | 0.5 | 4.8 |
| 18 | Formula (18) | 12 | 1.5 | 1.5 | 0.01 | 5.0 |
| 19 | Formula (19) | 10 | 2 | 0.2 | 0.5 | 5.1 |
| 20 | Formula (20) | 10 | 2 | 0.5 | 0.5 | 5.5 |
| 21 | Formula (21) | 10 | 2 | 1 | 0.5 | 5.0 |

Note:
Formula (15)  R = H, C$_2$H$_5$ (mixture)

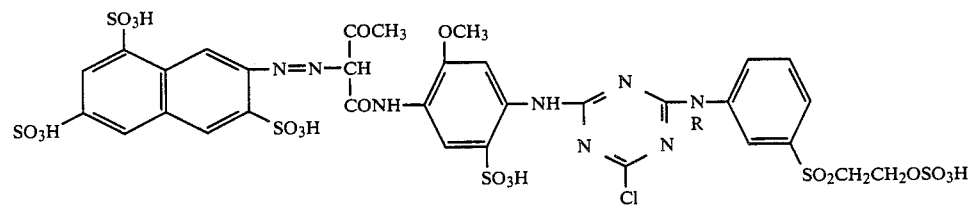

Formula (16)

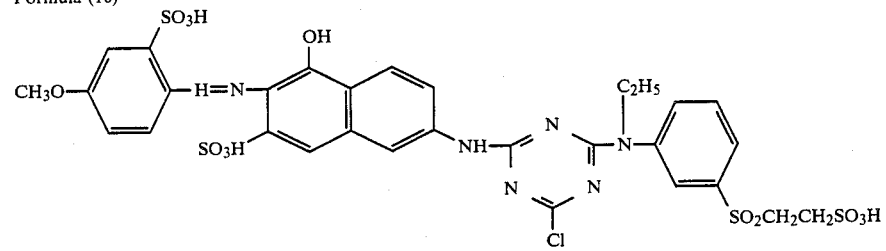

Formula (17)

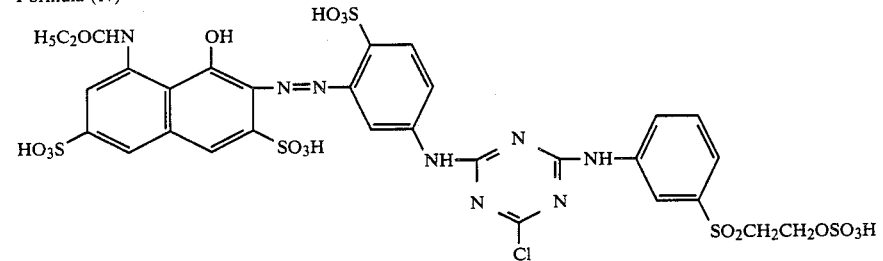

Formula (18)

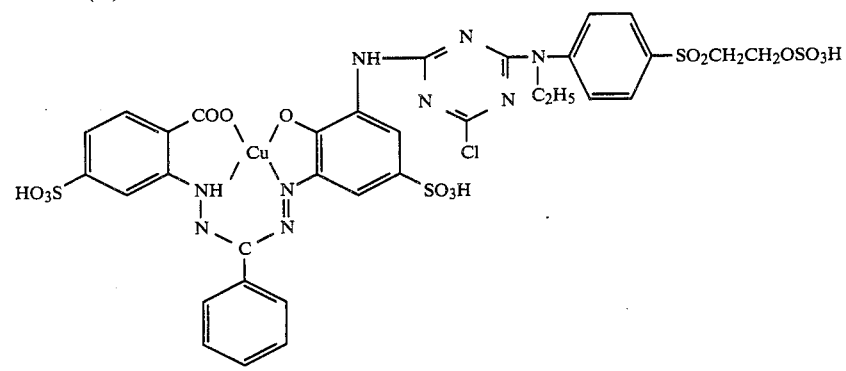

-continued

Formula (19)

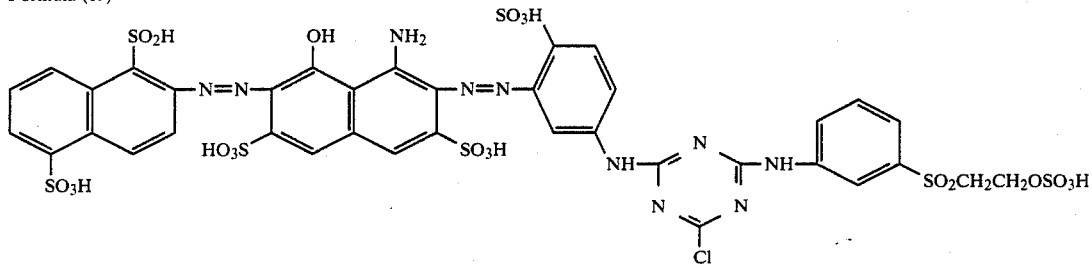

Formula (20)

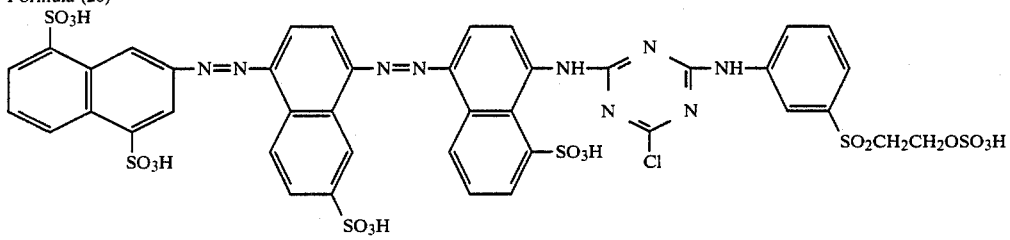

Formula (21)

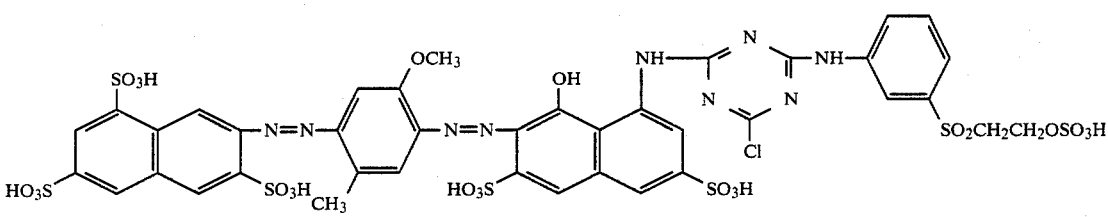

What is claimed is:

1. An aqueous liquid dye composition, which comprises a bifunctional reactive dye of the following formula,

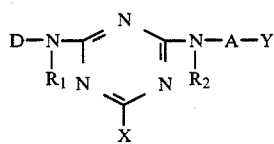

wherein D is an organic dye residue having at least one sulfonic acid group, $R_1$ and $R_2$ are independently a hydrogen atom or an unsubstituted or substituted lower alkyl group, A is an unsubstituted or substituted phenylene or naphthylene group, X is a halogen atom, and Y is $-SO_2CH=CH_2$ or $-SO_2CH_2CH_2Z$, in which Z is a splittable group by an alkali, in an amount of 5 to 50% by weight based on the weight of the liquid dye composition, the liquid dye composition having a pH value of from 3 to 7.

2. The liquid dye composition according to claim 1, wherein the liquid dye composition comprises a buffer in an amount of 5% by weight or less based on the weight of the liquid dye composition.

3. The liquid dye composition according to claim 2, wherein the amount of the buffer is 1% by weight or less.

4. The liquid dye composition according to claim 3, wherein the liquid dye composition has a pH value of 3 to 5.5.

5. The liquid dye composition according to claim 2, wherein the buffer is at least one member selected from sodium dihydrogenphosphate, disodium hydrogenphospahte, potassium dihydrogenphosphate, dipotassium hydrogen-phosphate, sodium acetate, potassium acetate, sodium borate, potassium borate, sodium oxalate, potassium oxalate and potassium hydrogenphthalate.

6. The liquid dye composition according to claim 1, wherein the bifunctional reactive dye is a member selected from the group consisting of monoazo dyes of the following formulae,

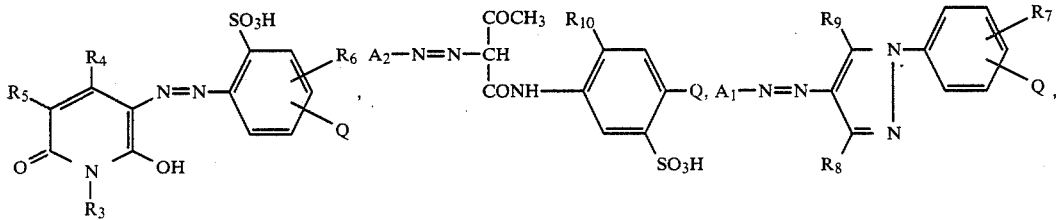

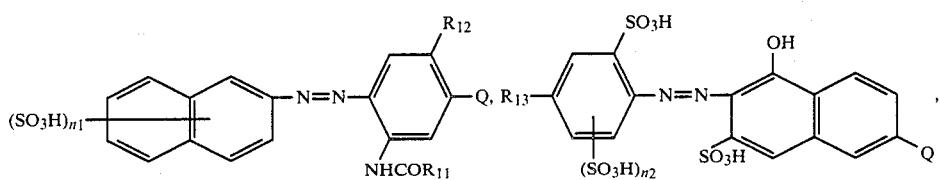
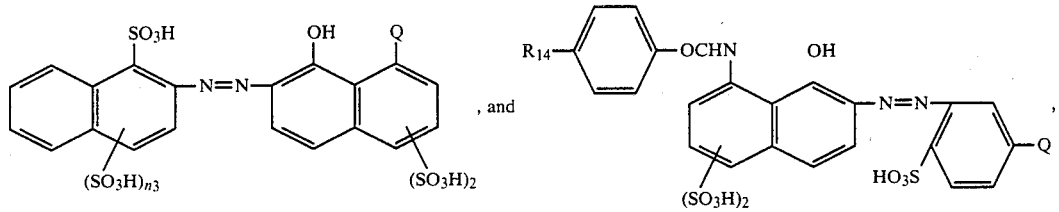
bisazo dyes of the following formulae,
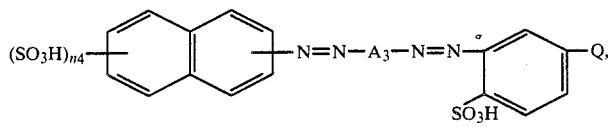
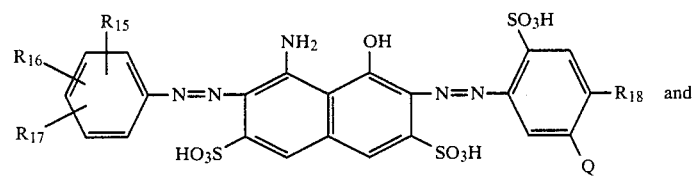
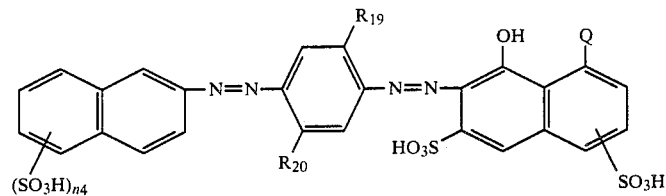
metal complex bisazo dyes of the following formulae,
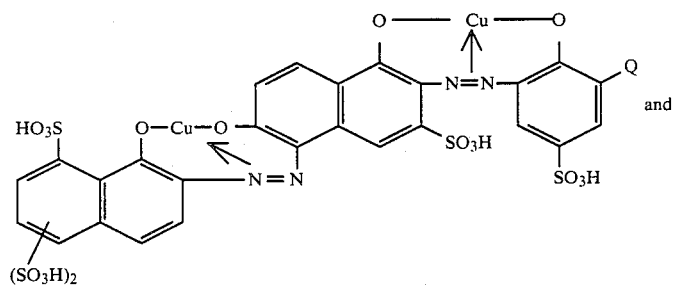
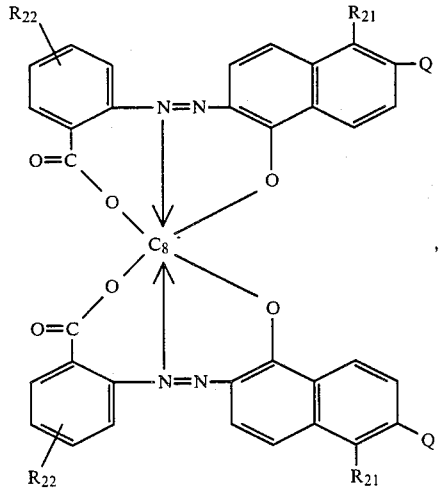
phthalocyanine dyes of the following formula, anthraquinone dyes of the following formula,

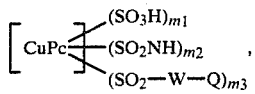

-continued

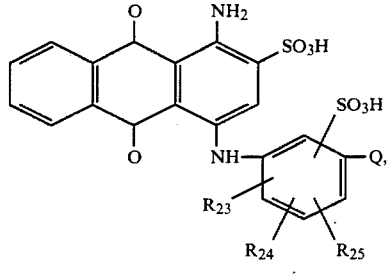

formazan dyes of the following formula,

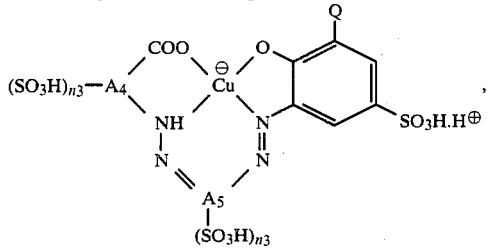

and dioxane dyes of the following formula,

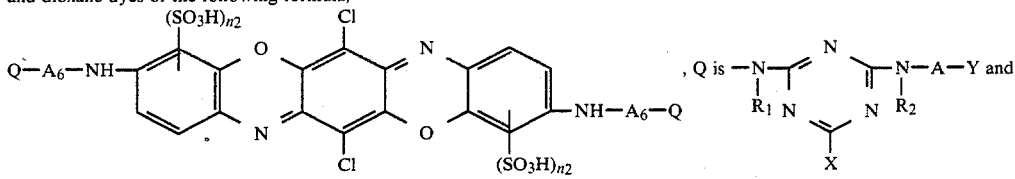, Q is 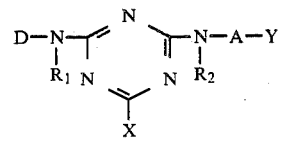 and wherein
- $R_3$ is hydrogen or lower alkyl,
- $R_4$ is lower alkyl,
- $R_5$ is hydrogen, cyano, carbamoyl or sulfo-lower alkyl,
- $R_6$ is hydrogen or sulfo,
- $R_7$ is hydrogen, lower alkyl or sulfo,
- $R_8$ is methyl, carboxy or methoxycarbonyl,
- $R_9$ is hydroxy or amino,
- $R_{10}$ is methoxy, ethoxy or sulfo,
- $R_{11}$ is methyl, amino or phenyl,
- $R_{12}$ is lower alkyl,
- $R_{13}$ is lower alkyl or lower alkoxy,
- $R_{14}$ is hydrogen, nitro or substituted amino,
- $R_{15, 16}$ and $R_{17}$ are independently hydrogen, chlorine, methyl, methoxy, sulfo or carboxy,
- $R_{18}$ is hydrogen or methyl,
- $R_{19}$ and $R_{20}$ are independently hydrogen, lower alkyl or lower alkoxy,
- $R_{21}$ is hydrogen or sulfo,
- $R_{22}$ is hydrogen, lower alkyl, lower alkoxy, sulfo or acetylamino,
- $R_{23}$, $R_{24}$ and $R_{25}$ are independently lower alkyl,
- $A_1$ is unsubstituted or substituted phenyl or naphthyl,
- $A_2$ is sulfophenyl substituted with methyl, ethyl, methoxy, ethoxy, phenoxy, acetylamino, propionylamine, HOOCCH$_2$CH$_2$CONH— or HOOCCH=CHCONH—, or naphthyl substituted with two or three sulfo,
- $A_3$ is residue of naphtholsulfonic acid,
- $A_4$ is unsubstituted or substituted phenylene,
- $A_5$ is unsubstituted or substituted phenyl,
- $A_6$ is unsubstituted or substituted phenylene, W is aminoalkyl residue, $m_1$ is 1 to 2, $m_2$ is 0 to 2 and $m_3$ is 1 to 2, provided that the sum of $m_1$, $m_2$ and $m_3$ are 4 or less,
- $n_1$ is 2 or 3,
- $n_2$ is 0 or 1,
- $n_3$ is 1 or 2, and
- $n_4$ is 1, 2 or 3.

7. A method for producing an aqueous liquid dye composition improved in storage stability, which comprises preparing an aqueous liquid composition comprising a bifunctional reactive dye of the following formula, $$D-N\underset{R_1}{|}-\overset{N}{\underset{N}{\diagdown}}\underset{X}{\diagup}\overset{N}{\diagdown}-N\underset{R_2}{|}-A-Y$$

wherein D is an organic dye residue having at least one sulfonic acid group, $R_1$ and $R_2$ are independently a hydrogen atom or an unsubstituted or substituted lower alkyl group, A is an unsubstituted or substituted phenylene or naphthylene group, X is a halogen atom, and Y is —SO$_2$CH=CH$_2$ or —SO$_2$CH$_2$CH$_2$Z, in which Z is a splittable group by an alkali, in an amount of 5 to 50% by weight based on the weight of the liquid dye composition, and adjusting the pH of the liquid composition within a range of from 3 to 7.

8. A method for storing an aqueous liquid dye composition, which comprises preparing an aqueous liquid composition which contain a bifunctional reactive dye of the following formula,

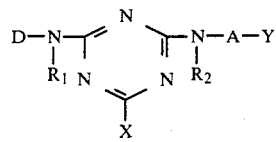

wherein D is an organic dye residue having at least one sulfonic acid group, $R_1$ and $R_2$ are independently a hydrogen atom or an unsubstituted or substituted lower alkyl group, A is an unsubstituted or substituted phenylene or naphthylene group, X is a halogen atom, and Y is $-SO_2CH=CH_2$ or $-SO_2CH_2CH_2Z$, in which Z is a splittable group by an alkali, in an amount of 5 to 50% by weight based on the weight of the liquid dye composition, and which composition has a pH value of from 3 to 7, and storing the liquid dye composition in a closed vessel.

9. A method for dyeing or printing fiber materials, which comprises using an aqueous liquid dye composition comprising a bifunctional reactive dye of the following formula,

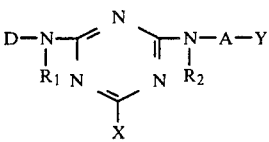

wherein D is an organic dye residue having at least one sulfonic acid group, $R_1$ and $R_2$ are independently a hydrogen atom or an unsubstituted or substituted lower alkyl group, A is an unsubstituted or substituted phenylene or naphthylene group, X is a halogen atom, and Y is $-SO_2CH=CH_2$ or $-SO_2CH_2CH_2Z$, in which Z is a splittable group by an alkali, in an amount of 5 to 50% by weight based on the weight of the liquid dye composition, and having a pH value of from 3 to 7.

10. Fiber materials dyed or printed by the method of claim 9.

* * * * *

UNITED STATES PATENT AND TRADEMARK OFFICE
CERTIFICATE OF CORRECTION

PATENT NO. : 4,693,725

DATED : September 15, 1987

INVENTOR(S) : Noriaki YAMAUCHI et al

It is certified that error appears in the above-identified patent and that said Letters Patent is hereby corrected as shown below:

IN THE SPECIFICATION

Column 4, lines 58, et seq, change:

"18184/1954 and 39672/1970, and Published Unexamined Japanese Patent Application Nos. 163276/1970, 4783/1971, 9483/1971, 14654/1971, 15481/1971, 37379/1971, 59870/1971, 91082/1971, 91083/1971, 92961/1971, 97262/1971, 103247/1971, 103249/1971, 103428/1971, 112584/1971, 118975/1971, 118976/1971, 123483/1971, 123484/1971, 128373/1971, 128375/1971, 128376/1971, 128377/1971, 128378/1971, 128380/1971, 128381/1971, 134279/1971, 140185/1971, 143573/1971, 159373/1971, 163153/1971, 2365/1972, 42985/1972, 42986/1972, 49663/1972, 57754/1972, 87467/1972" to

UNITED STATES PATENT AND TRADEMARK OFFICE
CERTIFICATE OF CORRECTION

PATENT NO. : 4,693,725          Page 2 of 3

DATED : September 15, 1987

INVENTOR(S) : Noriaki YAMAUCHI et al

It is certified that error appears in the above-identified patent and that said Letters Patent is hereby corrected as shown below:

-- 18184/1964 and 39672/1980, and Published Unexamined Japanese Patent Application Nos. 163276/1980, 4783/1981, 9483/1981, 14654/1981, 15481/1981, 37379/1981, 59870/1981, 91082/1981, 91083/1981, 92961/1981, 97262/1981, 103247/1981, 103249/1981, 103428/1981, 112584/1981, 118975/1981, 118976/1981, 123483/1981, 123484/1981, 128373/1981, 128375/1981, 128376/1981, 128377/1981, 128378/1981, 128380/1981, 128381/1981, 134279/1981, 140185/1981, 143573/1981, 159373/1981, 163153/1981, 2365/1982, 42985/1982, 42986/1982, 49663/1982, 57754/1982, 87467/1982 --

UNITED STATES PATENT AND TRADEMARK OFFICE
CERTIFICATE OF CORRECTION

PATENT NO. : 4,693,725

DATED : September 15, 1987

INVENTOR(S) : Noriaki YAMAUCHI et al

It is certified that error appears in the above-identified patent and that said Letters Patent is hereby corrected as shown below:

Column 5, lines 1-5, change:

"89679/1972, 92054/1972, 121058/1972, 139580/1972, 141455/1972, 13360/1972, 143572/1972, 143574/1972, 143575/1972, 143576/1972, 143581/1972, 187362/1972, 187363/1972, 187364/1972, 187358/1972, 192467/1972, 198758/1972,1973 and the like." to -- 89679/1982, 92054/1982, 121058/1982, 139580/1982, 141455/1982, 13360/1982, 143572/1982, 143574/1982, 143575/1982, 143576/1982, 143581/1982, 187362/1982, 187363/1982, 187364/1982, 187358/1982, 192467/1982, 198758/1982, 37057/1983 and the like. --

Signed and Sealed this

Sixteenth Day of January, 1990

Attest:

JEFFREY M. SAMUELS

Attesting Officer     Acting Commissioner of Patents and Trademarks